Dec. 4, 1962     C. A. SHAFFER     3,066,571
KALEIDOSCOPES
Filed Aug. 18, 1958
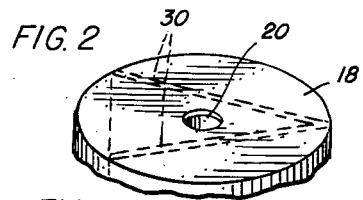
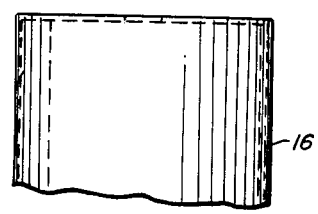
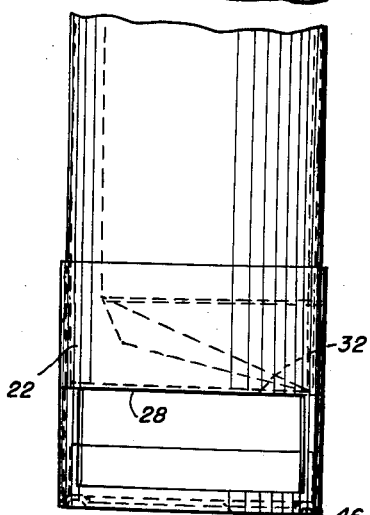
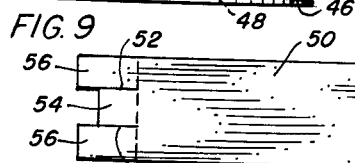
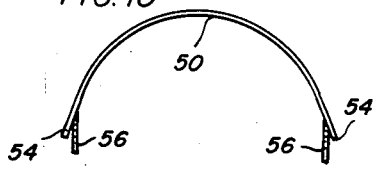
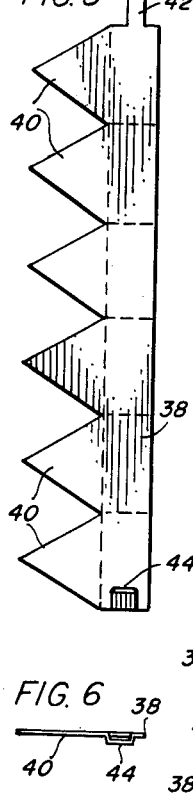
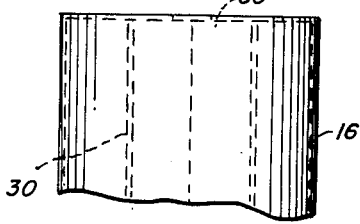
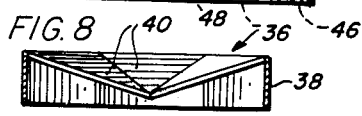
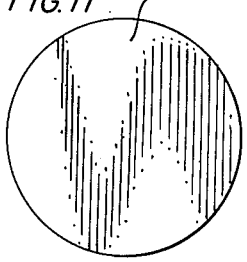
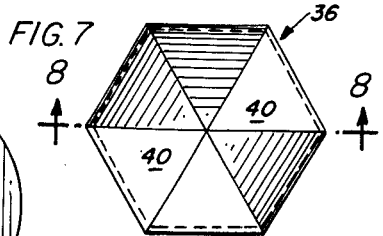
INVENTOR:
CLIFFORD A. SHAFFER
BY
Kent W. Wonnell
ATT'Y United States Patent Office 3,066,571
Patented Dec. 4, 1962

3,066,571
KALEIDOSCOPES
Clifford A. Shaffer, 810 Fairground, Newton, Ill.
Filed Aug. 18, 1958, Ser. No. 755,705
3 Claims (Cl. 88—15)

This invention relates in general to a kaleidoscope and more particularly to certain improvements in the structure and operation of such an instrument to give it greater usefulness and interest in the operation thereof.

The kaleidoscope currently manufactured holds the interest of a viewer for a very short time even though the pattern and color variations may be infinite in number, yet there is a monotonous over-all effect and lack of variation which fails to attract the interest. There is no challenge to the imagination or stimulus to any creative ability on the part of a viewer.

The two methods commonly used in viewing various objects and subject matter with kaleidoscopes are by use of direct light on the objects and by light diffused through translucent objects. The latter method has been preferred by manufacturers even though the subject matter is reduced essentially to a single category with little or no depth perception. By such limitation, the subject matter is necessarily preselected by the manufacturer, giving the user no control over it, or the arrangement of any of the objects to be viewed.

The present invention combines both methods of viewing in the same unit with equal or superior results and in a most simplified construction. It permits the viewer to use his own imagination and creative ability in determining the design or subject matter and infinitely increases the wonder and amazement in the results obtained.

An important object of the invention is to provide a construction which permits the user to duplicate designs that prove to be of the most interest and to permit the creation of very simple yet unusual and original designs.

A further object of the invention is to provide a construction which combines the use of direct light and diffused light by means of apertures and partitions and to create new designs in combination with colors which may be valuable to professional designers seeking new artistic effects.

Still a further object of the invention is to provide apertured and color attachments adapted to give movement to the subjects and means to use suitable live material, among other categories, as subject matter for producing surprising and sometimes spectacular effects.

Still a further object of the invention is to provide a kaleidoscope with an apertured extension at the bottom for inserting various auxiliary pieces such as a faceted holder with mirror surfaces at an angle, alone, and in combination with transparent colored discs and wall surfaces surrounding it.

Other objects of the invention will appear in the specification and will be more apparent from the accompanying drawings in which, FIG. 1 is a side elevation of a kaleidoscope case in accordance with this invention.

FIG. 2 is a perspective view of the top of the case shown in FIG. 1.

FIG. 3 is a side elevation of the case of FIG. 1 at right angles thereto.

FIG. 4 is a perspective view of the top of FIG. 3;

FIGS. 5 and 6 show a development and an end view thereof of a facet insert for the kaleidoscope of which a top view is shown in FIG. 7 and a sectional view in FIG. 8 taken on the line 8—8 of FIG. 7;

FIG. 9 is a development or flat face view of a clear film closure for an opening in the kaleidoscope case which is bent to a substantially semi-circular shape as shown in FIG. 10; and FIG. 11 shows a clear or colored film disc adapted to be inserted at the bottom of the inside of the case.

When viewing any object through a lens or with the unaided eye, light is an essential factor and by using direct light on the objects or subject matter, opaque objects present a wider and more interesting appearance than through the customary translucent partition. The bottom portion of the present case is preferably of clear transparent material which exposes the objects or subject matter both to direct light and to reflected light from all directions except for the area of the inside mirror or if a colored or opaque insert is used at the bottom, to produce certain desired effects. The lightest practical gage of clear or translucent material is used with suitable corrugations or strengthening portions to give adequate rigidity and strength.

Referring now more particularly to the drawings, a kaleidoscope casing 16 preferably circular in cross section is formed of light sheet metal, cardboard or other opaque material and has an opaque top or closure 18 with a central sight or viewing aperture 20 which may also be provided with a lens if desired.

At the bottom of the casing 16 is a transparent base 22 preferably of clear material such as a plastic, which fits over the outside of the casing 16 and forms a bottom casing portion which is firmly attached by an adhesive, or other suitable means, to the upper casing portion.

At one side of the transparent base 22 is a substantially diametric access opening 28 which is used for placing and rotating other viewing appliances therein and for inserting, removing and adjusting objects to be viewed in the base.

Within the casing 16, a V-shaped mirror 30 with its sides approximately at a 30° angle with respect to each other are closely held in the casing, the apex and ends of the sides abutting the inside of the casing with the sight aperture 20 at the top closure disposed centrally within the mirror, the inner sides of this insert having the mirror surfaces thereon. The angular apex of the mirror 30 extends below the bottom of the casing 16 where a clear film separator disc 32 is positioned transversely of the mirror 30 and at the inside of the transparent base 22. The lower end 34 of each side of the mirror 30 is bent upwardly at slightly less than a right angle for reflecting light from the bottom upon any subject matter included within the angle of the mirror.

A facet insert 36 as shown in completed form in FIGS. 7 and 8 comprises a strip of mirror material 38 as shown in FIG. 5 having a continuous band with angular projections 40 along one edge, a tongue 42 at one end and an opening 44 at the other end to engage the tongue when the strip is bent into circular form. The angular projections 40 are bent downwardly together to form a centrally depressed multi-faceted holder of sufficient diameter to substantially fill the inside of the base 22 and of a size to be easily inserted into and removed from the opening 28 in the base.

At its lower end, the base 22 is formed with an inwardly or upwardly turned flange 46 extending at the inside thereof and adapted to removably seat a clear or colored plastic disc 48 upon which the facet insert 36 may also be seated or the connected strip of material 38 may be supported directly upon the flange 46 if the plastic disc 48 is omitted or removed.

A simple closure for the access opening 28 comprises a strip 50 of clear flexible material preferably the same as the lower portion of the case, and adapted to be flexed or bent substantially into a semi-circle as shown in FIG. 10. Each end has parallel slits 52 forming a central tongue 54 and outer tongues 56, the latter bent inwardly and adapted to be inserted within the sides of the opening 28 with the tongues 54 at the outsides of the openings to thereby close and seal the opening 28 when the strip is inserted in place as a closure for the opening. This simple closure converts the viewing area within the base into the usual type of kaleidoscope when objects to be viewed are placed therein and is particularly useful when live material is used.

The opening 28 below the protective clear separator disc 32 at the base of the V-mirror permits the viewer to place any chosen object or subject within the case or the base thereof in position for viewing. The subject matter can be located, relocated or revolved on an insert by simple finger movement from the opening. Objects of sufficient length may be held externally to the opening and extending therein and movement applied to produce surprising new effects. Various lines and designs on slips of paper or other materials may be readily inserted, changed and rotated so that the subject matter is inexhaustible. The closure 50 is useful if live material such as small moths, millers, lady bugs, caterpillars, lightning bugs, etc., are inserted offering many intriguing subjects and variations.

The facet insert 36 is preferably of plastic or metal having a mirror surface at the inner or faceted surface which produces designs of cut gems and the like, and gives depth to the created patterns. Objects of color placed in this insert bring a new dimension to the kaleidoscope since the insert itself becomes like a crystal diamond with appropriate sparkling facets. A transparent or translucent colored film such as the removable disc 48 may be placed over the insert 36 which changes the diamond reflection into the appropriate sparkling gem of that color. Faceted and colored inserts thus may act as a container for small objects to be viewed or as a platform for flat subject matter as well as the faceted designs, a change of color producing a different effect with every change of film.

The base 22 closure may be the transparent plastic disc 48 which is supported on top of the flange 46 so that when the kaleidoscope stands on end, only the circumferential edge contacts the surface, thereby preventing scuffing of the major central area of the disc, and the raised bead of the flange supports the inserts thereby protecting the large center area of the closure also from undue scuffing. The flange extremity adds rigidity to the case in general and to the lower portion of the side opening 28 in particular.

While a preferred embodiment of the invention has been described in some detail, it should be regarded as an illustration or example rather than as a limitation or restriction of the invention, since various changes in the construction, combination, and arrangement of the parts may be made without departing from the spirit and scope of the invention.

I claim:
1. A kaleidoscopic viewer having an upper casing and a lower end portion with a V-shaped mirror mounted therein, and a viewing aperture at the top within the V, a transparent bottom casing portion extending beyond the lower end of the upper casing portion and of light transmitting material, means in the transparent bottom casing portion for supporting material to be viewed below the end of the mirror and comprising a light transmitting disc at the bottom of the mirror and affixed to the inner periphery of the lower end casing portion, the said lower end of the upper casing portion forming the top of the object viewing area, and removable object supporting means in the transparent bottom casing portion forming the bottom of the object containing area, said transparent bottom casing portion being formed with an opening through which access may be had between the lower end of the top casing and the bottom of the transparent bottom casing portion, and a flexible closure strip having end tongues to engage both sides of the transparent casing portion forming the ends of the opening, said object supporting means comprising an article holder having a plurality of inclined mirror facets extending upwardly from a common center and adapted to be removably inserted through the said opening of the lower transparent bottom casing portion.

2. A viewer in accordance with claim 1, in which the faceted holder comprises a mirror strip formed with angular facets extending from one side of a strip bent to form a hexagonal band with the extremities of the projections engaging at a common apex beyond the planes of the bases of the projections forming inclined facets when the holder is inserted and supported in the lower portion of the casing.

3. A kaleidoscopic viewer having an upper casing and a lower end portion with a V-shaped mirror mounted therein, and a viewing aperture at the top within the V, a transparent bottom casing portion extending beyond the lower end of the upper casing portion and of light transmitting material, means in the transparent bottom casing portion for supporting material to be viewed below the end of the mirror and comprising a light transmitting disc at the bottom of the mirror and affixed to the inner periphery of the lower end casing portion, the said lower end of the upper casing portion forming the top of the object viewing area, and removable object supporting means in the transparent bottom casing portion forming the bottom of the object containing area, the V-shaped mirror having lower extremities which are angular and are bent permanently upward to extend outwardly from the sides of the mirror forming additional mirror surfaces at the lower end thereof and facing downwardly and in opposition to the said object supporting means in the transparent bottom casing portion to direct light upon the tops of articles to be viewed in said casing and at the bottom of the mirror.

References Cited in the file of this patent

UNITED STATES PATENTS

| 151,005 | Bush | May 19, 1874 |
| 314,586 | Leach | Mar. 31, 1885 |
| 1,398,858 | House | Nov. 29, 1921 |
| 2,697,380 | Wyser | Dec. 31, 1954 |

FOREIGN PATENTS

| 172,623 | Germany | July 3, 1906 |